United States Patent [19]

Knowles

[11] Patent Number: 5,398,024

[45] Date of Patent: Mar. 14, 1995

[54] SIGNAL ANNUNCIATORS

[76] Inventor: Todd Knowles, 16040 N. 64th Dr., Glendale, Ariz. 85306

[21] Appl. No.: 924,741

[22] Filed: Aug. 4, 1992

[51] Int. Cl.[6] .......................... B60Q 1/26; G08B 3/00
[52] U.S. Cl. .................. 340/474; 340/384.6; 340/384.7; 340/384.73; 340/396.1
[58] Field of Search ............... 340/384 E, 384 R, 388, 340/474, 384.6, 384.7, 384.73, 388.8, 396.1

[56] References Cited

U.S. PATENT DOCUMENTS

| | | | |
|---|---|---|---|
| 3,815,129 | 6/1974 | Sweany | 340/388 |
| 3,879,726 | 4/1975 | Sweany | 340/384 E |
| 4,139,842 | 2/1979 | Fujita et al. | 340/384 E |
| 4,195,284 | 3/1980 | Hampshire et al. | 340/384 R |
| 4,213,121 | 7/1980 | Learn et al. | 340/384 E |
| 4,328,485 | 5/1982 | Potter | 340/384 E |
| 4,486,742 | 12/1984 | Kudo et al. | 340/384 |
| 4,567,806 | 2/1986 | Kodaira | 84/1.26 |
| 4,594,573 | 6/1986 | Yoshino et al. | 340/384 E |
| 4,604,606 | 8/1986 | Sweany | 340/384 E |
| 4,746,905 | 5/1988 | Harima et al. | 340/384 E |
| 4,980,669 | 12/1990 | Knowles | 340/474 |
| 5,181,019 | 1/1993 | Gottlieb et al. | 340/384 E |

OTHER PUBLICATIONS

Mallory catalog 4–10–03D "Sonalert Electronic Audible Signals" pp. 2–5, Jan. 1991.

*Primary Examiner*—Donnie L. Crosland

[57] ABSTRACT

Signal Annunciators are presented that emit short tones upon being triggered by an electrical signal. They are intended primarily as automotive turn signal and emergency light operation indicators and are designed to be connected downstream of the turn signal switch. They comprise oscillating circuitry and piezoelectric discs. In each, capacitors are used to cause a decay in the volume of the tone produced. In the first species, a capacitor is placed in series with the oscillating circuitry. When a signal voltage is applied to the circuit, the capacitor begins to charge, passing current to the oscillator and disc, which emits sound. As the capacitor charges, less and less current is passed, creating a brief tone of decaying volume. The same effect is created in the second species by placing a smaller capacitor in series with the bias current input of the amplifier in the oscillating circuit. The third species resembles the second, but has a signal input separate from its power supply connections which allows for high input impedance. The devices produce consistent, short, pleasant tones regardless of the length of the input signal, without additional circuitry. They are intrinsically simple and contain very few components. A new case design is also presented for circuit board mounting that allows the sound to be emitted in a direction planar to the circuit board.

9 Claims, 6 Drawing Sheets

SIGNAL ANNUNCIATORS

BACKGROUND—FIELD OF INVENTION

This invention relates to audio indicating devices and specifically to automobile turn signal and emergency light flasher operation audio indicators.

BACKGROUND—PRIOR ART AND COMPARISONS WITH PRESENT INVENTION

The present invention, as have many before, addresses the problem of alerting a driver to the operation of his turn signals and emergency flasher lights. And, more specifically, to doing so in a pleasant manner. A more complete discussion of the prior art can be found in applicant's previous U.S. Pat. No. 4,980,669, ANNUNCIATOR FOR AUTOMOTIVE SIGNAL LIGHT FLASHERS to Knowles(1990). This previous invention operated by allowing a capacitor to charge through one path while the flasher was open (lights 'off') and discharge through another path when the flasher closed (lights 'on'). To create sound, an oscillator and transducer were placed in the discharge path. Because the capacitor discharge current decayed exponentially, so did the volume of the sound produced by the oscillator and transducer, creating a natural sounding note, like a dampened piano key being struck. The present invention is an improvement over this prior invention.

The prior device was intended for aftermarket installation at the turn signal flasher and for that reason was designed to function with the connections available there. This leads to three operational shortcomings—First, because some flashers start in their closed position, the lights are turned 'on' immediately when the turn signal lever is operated. With no preceding 'off' period in which to charge, the earlier annunciator does not function the first time the lights turn on. Second, with these flashers, this prior device will perform an extra beep if the signal lights are turned off during the 'off' portion of the flasher cycle because this type of flasher comes to rest in its 'on' position whether or not the circuit is completed through the turn signal light switch to the lights and ground. Third, this prior device did not respond to the emergency light flasher unless a second, identical device was purchased and installed on the emergency lights flasher.

These three shortcomings could be solved by connecting this previous device (without alteration) between the signal light conductors and a positive connection to the automobile's electrical system—in effect connecting it across both the flasher and the turn signal switch. It is desirable, however, to minimize the number of connections to the positive side of the electrical system because every connection requires additional insulated wiring, whereas connections to ground require no insulation and are readily available all over the vehicle. For this reason, it is determined that a signal annunciator as envisioned herein should operate between the signal light conductors and ground.

Further, the prior device incorporated two diodes not required in the present device. One diode functioned only during installation to apprise the do-it-yourself installer if he had the device installed backward. This is not required in an OEM assembly process and should be deleted to save cost. The second diode, in the discharge path, served no function when placed in series with an oscillator incorporating a semiconductor amplifier.

The present invention solves these shortcomings in economical ways. It avoids the first shortcoming by operating on capacitor charging current (instead of discharge current) so that operation need not be preceded by a charging period. The second and third shortcomings are overcome by connecting to the signal light conductors between the turn signal switch and the lights. This is accomplished with two parallel diodes or resistors. When resistors are used, they are of sufficiently high value that the shorting current between signal light conductors is negligible. In this way, the annunciator responds to exactly the same signals the signal lights receive, whether they are for turning signals or emergency flashing.

Species 1

In the first species, these improvements in function are brought about by simply changing the rectifiers that dictate the charge-discharge paths and eliminating the extra diodes of the previous invention.

In the present invention, the oscillator and transducer of the prior patent are placed in series with the charging path. In the preferred embodiment, an amplifier and piezoelectric disc are used as an integrated oscillator—transducer. The operation of such an amplifier and piezoelectric disc together (but without a capacitor) as a sound emitting feedback oscillator is well described in prior U.S. Pat. No. 3,815,129, PIEZOELECTRIC TRANSDUCER AND NOISE MAKING DEVICE UTILIZING SAME to Sweany (1974).

In the present invention, when a voltage is applied to the circuit, the capacitor charges through the amplifier and piezoelectric disc, causing sound to be produced. The current and the sound it produces decrease as the capacitor charges. Charging current stops completely when the capacitor is fully charged, ending the tone produced, even though the signal voltage is still applied. When the signal voltage is removed, the capacitor is allowed to discharge through a discharge rectifier and is ready for another operation.

A preferred embodiment of this species is fully described later and consists of an NPN transistor, three element piezoelectric disc, 4 resistors, 3 diodes and a capacitor of around 4 µf. This configuration is similar to that of a portion of prior U.S. Pat. No. 4,213,121, CHIME TONE AUDIO SYSTEM UTILIZING A PIEZOELECTRIC TRANSDUCER to Learn et al. (1980)

This prior patent discloses a continuing alarm sounder. It incorporates a continuously repeating signal generator comprising half the invention and is intended for alarm functions such as 'Door ajar!' or 'Key left in ignition!', and for pagers. It responds to the presence of a signal by repeatedly 'chiming' at a preset rate until the signal is ended.

The present invention intended for a different function differs from the prior in that it does not have a signal generator, incorporates additional features required for its specific function and is smaller and less expensive to manufacture.

Without the signal generator of the prior device, the present invention is allowed to respond at the rate of flasher operation. This feature is both desirable and necessary for use as a turn signal annunciator. Hearing the emitted tone at the same instant as the lights are turning on is natural and pleasant. Listening to a train of pulses completely unrelated to the flashing indicator lights on a dashboard is annoying. Further, synchronized operation is necessary for a signal annunciator because the rate of flashing indicates system conditions to which the driver should be made aware. An 'original equipment' flasher, for instance, flashes more slowly when one of the signal lights isn't functioning. The prior patent if used in this role would respond to signal light operation with a steady stream of tones, not synchronized to the operation of the lights nor indicative of system conditions.

Additionally, the present invention incorporates circuitry necessary to its function not found in the prior patent to eliminate the effect of voltage spikes found in an automobile electrical system and to connect to an automobile's signal light system without shorting the right and left sides together. And, because the present invention comprises the minimum number of components required for its function, it can be made physically small enough to fit inside standard piezoelectric buzzer cases, which are designed to complement mass produced discs, and are small, durable, attractive and inexpensive.

Species 2

In the previously cited patents (Knowles and Learn), capacitors have been placed in series with the sound producing components. The capacitor in this position must be able store all the charge required to operate the device—generally a few milliamps of current for a portion of a second. This results in a size of 3 $\mu F$ or larger, making the capacitor the largest component in the device after the piezoelectric disc itself.

In U.S. Pat. No. 4,567,806, SOUND GENERATOR to Kodaira (1986), a charged capacitor is allowed to discharge into the base terminal of a transistor through a switch operating at a preselected audio frequency, creating a decaying tone of that frequency. Although this patent relates to a musical instrument, the same goals of shaping the volume of the tone and limiting its duration are achieved. While it is not disclosed in the patent papers, it is assumed that the particular capacitor used was much smaller that those of the first two patents because it had only to store sufficient charge to drive the transistor base.

Species 2 of the present invention, as in Kodaira, limits only the amplifier input signal current, not the amplified load current. This allows the capacitor to be smaller than the those in the two prior patents by a factor roughly equal to the gain of the amplifier—one hundred or more times smaller, resulting in a significant savings in both size and cost.

Species 2 of the present invention improves on Kodaira itself in a less direct way. Kodaira describes a complicated keyboard instrument with means to select various pitches to be reproduced. The present invention, intended for a very different purpose, produces only a single pitch but does so with extreme economy. Further, in the present invention , as with all amplifier-piezoelectric oscillators using three electrode discs, the functions of amplification and frequency generation are integrated. And the frequency of the emitted sound is dictated by the resonant frequency of the piezoelectric disc through feedback. These differences in operation allow the present invention to be constructed and to accomplish its purpose with very few components.

Species 2 of the present invention as described in drawing #1 of 'Disclosure describing ONE SHOT BEEPER by TODD KNOWLES', Oct. 10, 1991, disclosure document identification number 292833, Oct. 7, 1991, comprises an amplifier-piezoelectric oscillator circuit as in Sweany except that a small capacitor is placed in series with the amplifier bias input circuit. In this way, oscillations are limited not by available drive current but by the amplifier's ability to continue passing the current. As in Species 1, when the signal voltage to the circuit returns to its low state, the cathode of the capacitor is allowed to discharge by a discharge diode connected to ground, returning the input circuit to its original condition. When resistors alone are used in the input conductor, the anode is automatically discharged through them. When diodes are used, an additional discharge resistor must be added from the capacitor's anode to ground.

Species 3

In the so-called 'smart wiring' scheme of future automobiles, signal lights with integral switches will turn themselves 'on' and 'off' driven by central computer commands. A turn signal annunciator in such a system would be driven directly by a computer. For this application as well as many present day logic controlled applications, high input impedance is desirable. Species 3 is a modification of Species 2 in which the bias current input to the capacitor is disconnected from the positive side of the circuit and left unattached to serve as a separate signal input. A high impedance signal input is easily formed by adding a suitable input resistor in series. The sound created is the same as with the other species.

Possible applications for Species 3 of the present invention in addition to turn signal annunciator include functions such as radar detector sounding element or general purpose electronic sounder for microwaves, VCR's or timers.

Case design

Because Species 3 would most likely be mounted on a circuit board, a new case design is also presented that allows for orientation of the sound emitting axis of the annunciator in a direction parallel to the surface of the circuit board to which it is installed. This is desirable in many instances because the plane of the installed circuit boards are often perpendicular to the surface from which the sound should emanate such as in an automobile's radio or radar detector. Because the mounting pins of a typical buzzer protrude from the end opposite the sound release hole, when it is installed on such a board its sound release hole doesn't face the front panel. Also, previous buzzers cannot be mounted on the solder side of the board because they cover their own pins. Products in which the buzzer must face forward have mounted the buzzer separately from the circuit board behind the front panel. This impedes the process of assembly in two ways—First, the mounting operation to the front panel must be hand performed. And second, if the buzzer is soldered at the same time as the other components, it hangs loose, subject to damage, until final front panel assembly or, if it is soldered later, that step is by hand.

In the present invention, the plastic shell of a standard piezoelectric buzzer case with its resonating chamber is used and a new terminal board is substituted for the existing one. The improvement lies in the shape of the new board, see FIG. 7. Its connection pins are in the same plane as the board, not perpendicular to it as in earlier designs. The pins protrude beyond the perimeter of the case and solder to the product's circuit board, negating the need for any further attachment. Because the mounting pins are located at the end opposite the sound release hole, nearly the entire case can protrude beyond the product's circuit board edge to fit into its front panel. Also, because all pins remain unobstructed after installation, these devices can be mounted on either side of a product's circuit board-solder side, or component side.

This orientation of the sound release hole is the same as that of a device depicted in a photograph from a current Mallory catalog, Form No. 4-10-03D. This custom device has a terminal board much larger than the sounding element and case, mounted on which are fifteen exposed components. The improvement in the present invention lies in the fact that its new terminal board is approximately the same size as the resonating chamber and fits neatly into the rear cavity of the same plastic case. All electronic components fit inside the case, in the rear cavity adjacent to the resonating chamber. The space available is sufficient for all components of each of the species, and would easily accommodate all fifteen components of the Mallory custom device. The present invention thereby presents a durable, attractive, neat appearance but is no more complicated or expensive to build than this prior device.

This case design relates to prior patent U.S. Pat. No. 4,746,905 SOUND PRODUCING DEVICE to Harima et al. (1988). Although it is not cited as an element of that invention, the resulting orientation of its sound release hole is in the proposed advantageous direction. However, whereas the present invention uses an industry standard plastic part with integral resonant chamber, this prior invention comprises a completely new case with the circuit board as a part of the resonating chamber. While this in fact may lead to reduced cost, it will do so only with great production volume, whereas the present invention can be expected to be inexpensive immediately. Further, because two of the connection pins on the circuit board of the Harima device are on the same end as the sound release hole, it cannot be mounted so as to protrude beyond the front edge of a product's circuit board and so cannot engage into a front panel.

OBJECTS OF THE INVENTION

The primary object of the present invention is to provide a means by which a driver is reminded that his signal lights are on and operating by providing a short pleasant sound each time his lights are turned on by the flasher.

Another object of the invention is to provide a sound whose volume, pitch, decay and duration are carefully chosen so as not to be annoying in any way.

An additional object of the invention is to provide a device that is small and easily installed during the manufacture of an automobile or other product.

A further object of the invention is to function as a general purpose noisemaker in electronic devices such as microwaves, timers, radar detectors, VCR's and TV's.

An additional object of Species 3 is to provide high signal input impedance.

A still further object is to provide a case for circuit board mounting that directs the sound emitted in an advantageous direction planar to the surface of the circuit board.

Another object is to provide an attractive, neat appearance by enclosing all components within the case.

A final object of the invention is to accomplish all of the above at a low cost.

BRIEF DESCRIPTION OF THE DRAWING FIGURES

DETAILED DESCRIPTION OF THE DRAWING FIGURES

Figure 1:
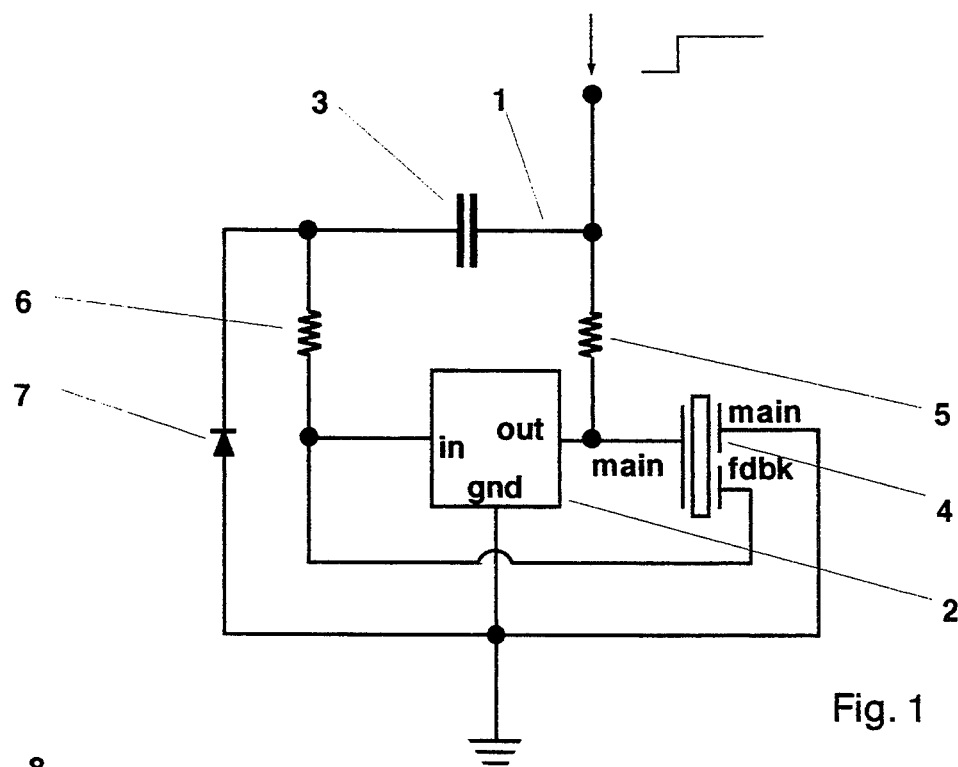
FIG. 1 is a generalized schematic diagram of the invention.

Referring to FIG. 1, a generalized schematic of the invention is presented. Input conductor 1 is connected between the input signal and the input of amplifier 2. Capacitor 3, placed in series with the input conductor serves to limit input current as will be described below. Disc 4 is a piezoelectric disc comprising a metal diaphragm, a piezoelectric material and three metal electrodes of the configuration proposed in Sweany. Two of the electrodes are main electrodes, commonly called drive and common. The disc deforms when a voltage is placed across these electrodes, and oscillates when a pulsed voltage is applied, emitting sound. The third, feedback electrode outputs a brief voltage spike as the disc deforms. Its polarity depends on a poling voltage used during manufacture of the disc and the direction of deformation, which in turn depends on the polarity of the voltage across the drive and common electrodes. Load conductor connections to amplifier 2 at its ground and output terminals and are made to the ground voltage source and to one of three possible positive voltage sources dependent upon species type as indicated by the dashed lines and described below. Load resistor 5 is in series with the load conductor between the output of amplifier 2 and the positive voltage source. The output of amplifier 2 is also connected to one main electrode of disc 4, and the feedback electrode from disc 4 is connected to the amplifier input providing an AC signal to be amplified and fed back. The other main electrode of disc 4 is shown connected to ground. The required DC component of the input signal is provided by input conductor 1 through bias resistance 6.

As with other amplifying circuits, other possible connections between amplifier 2, load resistor 5 and disc 4 exist. Load resistor 5 can be anywhere in the circuit in series with the load connections of amplifier 2. The main electrodes of disc 4 can be across either the amplifier or the load resistor. As taught in Sweany, the polarity of the main electrode connections (drive and common) is chosen so that the feedback signal from the disc creates amplifier output that is in phase with the disc oscillations. The choice is affected by the type of amplifier (inverting or non-inverting, positive input or negative input) and the polarity of the poling voltage used in the manufacture of the particular disc.

The species of the invention is determined by the positive voltage source to which amplifier 2 is connected. S.1 indicates the connection used in Species 1; S.2 is for Species 2; S.3 is the connection used in Species 3. In Species 1, capacitor 3 provides all the circuit current because the load conductor connected to the output of amplifier 2 connects to the signal conductor 'after' the capacitor. In Species 2, only the bias input current to amplifier 2 is provided by capacitor 3, however, all of the circuit current is still provided by the signal. In Species 3, capacitor 3 again provides only the bias input current but because the current source for amplifier 2 is now a permanent positive voltage source, only the input bias current is supplied by the signal.

In all species, at the beginning of a cycle, full volume is reached as capacitor 3 begins charging at full voltage. But, as capacitor 3 charges, the charging current diminishes causing the volume of the sound emitted to decay until capacitor 3 is fully charged and passes no current. The circuit remains in this state until the signal returns to its original state, removing the input voltage and discharging the signal plate of capacitor 3. The other plate of the capacitor is discharged though discharge rectifier 7 to ground.

Figure 2:
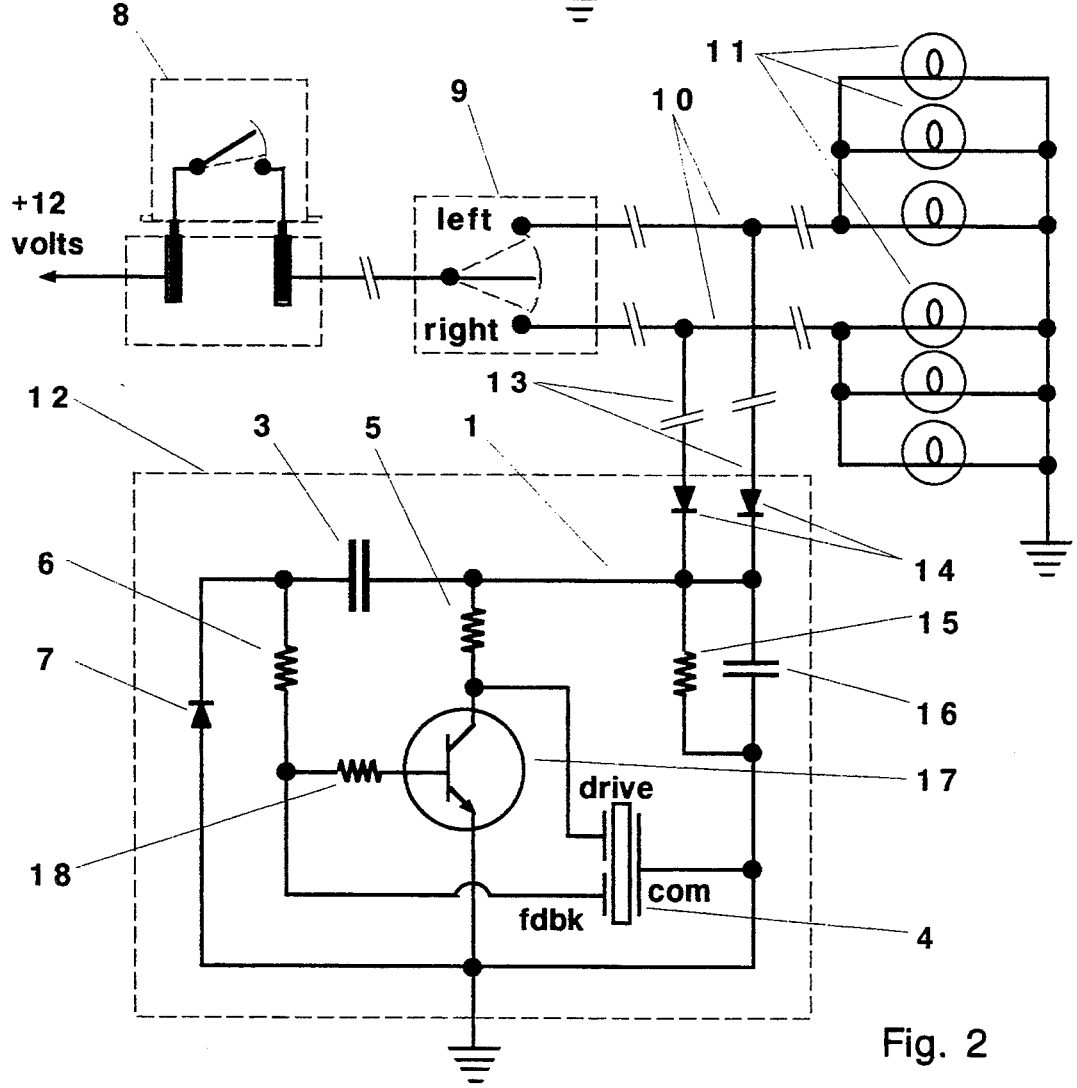
FIG. 2 is a schematic diagram of a preferred embodiment of Species 1, including the pertinent parts of a vehicular turn light signaling system.

Referring to FIG. 2, a preferred embodiment of Species 1 is shown including the pertinent parts of a standard vehicular signal light system. Starting at the upper left, standard flasher 8 is shown connected to the positive side of the vehicle electrical system and to manually operated turn signal switch 9. If switch 9 is closed to either the 'right' or 'left' contacts, a circuit is completed through signal light conductors 10 and signal lights 11 to ground. As soon as current flows, flasher 8 alternately makes and breaks the circuit at a rate affected by the amount of current flowing, thereby flashing lights 11. Invention 12 is connected to the system at signal light conductors 10 between switch 9 and lights 11 through signal conductors 13, which are connected to the signal end of input conductor 1. Signal diodes 14 are placed in series with conductors 13 to avoid shorting current between signal light conductors 10. In this position however, signal diodes 14 block discharge current from capacitor 3. Discharge resistor 15 is added to accomplish this function. The value of this resistor is set so that nearly all of the 'off' portion of the flasher cycle is required to discharge capacitor 3.

A second effect of discharge resistor 15 in slowing the discharge rate of capacitor 3 is that, when used with a faster than normal flasher 8, capacitor 3 will not be completely discharged each cycle. Therefore, less charge current will flow, resulting in a quieter than normal sound being emitted from disc 4 each time flasher 8 closes, having the effect of producing the same general volume level as would the system with a slower flasher.

Bypass capacitor 16 and load resistor 5 act as a bypass filter to shunt unwanted voltage spikes to ground. Without this feature, common electrical noise found in most vehicles impresses voltage spikes in the two to five Khz range across the disc during operation, causing unwanted noise of the same frequency to be emitted.

Signal diodes 14, discharge resistor 15, bypass capacitor 16 as well as other circuit additions to be introduced in later figures are optional to the basic device configuration shown in FIG. 1 and serve to provide the input signal represented there.

Amplifier 2 is replaced by NPN transistor 17 installed in the common emitter configuration. Amplifier input resistor 18 is added in the input circuit to limit the effect of voltage spikes from the feedback electrode. Note that as installed, transistor 17 inverts its output to disc 4. The resulting drive and common electrode connections from disc 4 are as taught in Sweany.

| Capacitor 3 | 4.3 μF | Diodes 14 | 1N4000 |
|---|---|---|---|
| PZ disc 4 | M.E. PKM11-6AO | Resistor 15 | 24KΩ |
| Resistor 5 | 510Ω | Capacitor 16 | 2.2 μF |
| Resistor 6 | 150KΩ | Transistor 17 | NTE 85 |
| Diode 7 | 1N4000 | Resistor 18 | 3.9KΩ |

Figure 3:
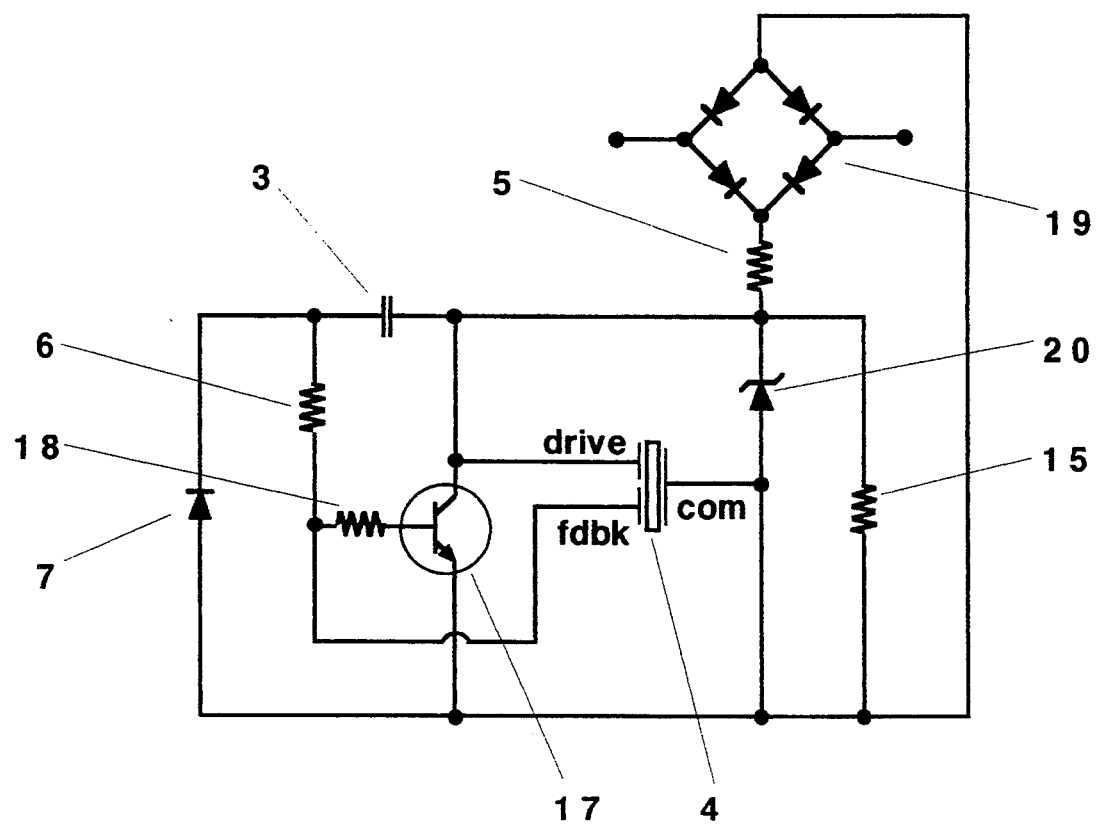
FIG. 3 is a schematic diagram of a preferred embodiment of Species 2.

Referring to FIG. 3 in which a preferred embodiment of Species 2 is presented, it is seen that load current to transistor 17 and disc 4 is provided directly by the signal and that only the bias input current into the transistor is provided by capacitor 3. This important change results in a required capacitor size 1/100th that of Species 1.

An alternative input arrangement is also presented allowing the device to function without a separate ground connection. This can be accomplished because the turn signal conductor that is not energized by the turn signal switch is itself grounded through the lights connected to it. Diode bridge 19, connected between the two conductors rectifies the voltage for operation in either direction. A disadvantage to this arrangement is that the device will not respond to emergency flasher operation as both turn signal conductors are energized simultaneously while in that mode.

In addition, a different filtering scheme is presented in place of the bypass capacitor of FIG. 2. Zener diode 20 is placed between the circuit input and ground. Its zener voltage is chosen to be approximately equal to or slightly less than the expected signal voltage. Load resistor 5 is placed between the signal and the zener to limit the voltage that the diode actually sees. In this configuration, the peaks of the unwanted portion of the signal are shunted to ground by diode 20.

Discharge resistor 15, as before, discharges the signal plate of capacitor 3 to ground after signal voltage is removed.

| Capacitor 3 | .043 μF | Diodes 14 | 1N4000 |
|---|---|---|---|
| PZ disc 4 | M.E. PKM11-6AO | Resistor 15 | 24KΩ |
| Resistor 5 | 510Ω | Transistor 17 | NTE 85 |
| Resistor 6 | 150KΩ | Resistor 18 | 3.9KΩ |
| Diode 7 | 1N4000 | Zener diode 20 | 11volt,.5w |

Figure 4:
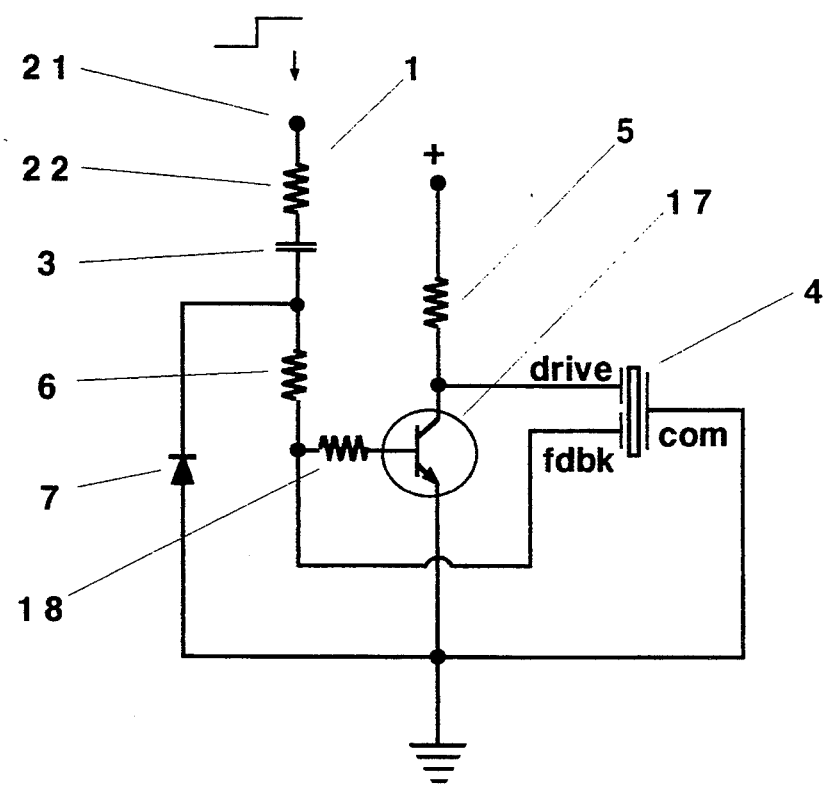
FIG. 4 is a schematic diagram of a preferred embodiment of Species 3.

In FIG. 4, a preferred embodiment of Species 3 with high input impedance is shown. Signal input conductor 1 is completely separated from the load portion of the circuit and signal terminal 21 is formed. High signal input impedance is easily achieved by adding input resistor 22 in series with input conductor 1. Transistor 17 is again used with load resistor 5. The circuit functions in much the same way as Species 2 in FIG. 3 except that, because the positive current supply to transistor 17 is now continuous, operation is completely controlled by bias current input from the signal through capacitor 3, with the same results, however. A much smaller signal can now be used because it no longer provides the entire device current.

Suggested components are:

| Capacitor 3 | .043 µF | Diode 7 | 1N4000 |
|---|---|---|---|
| PZ disc 4 | M.E. PKM11-6AO | Transistor 17 | NTE 85 |
| Resistor 5 | 510Ω | Resistor 18 | 3.9KΩ |
| Resistor 6 | 150KΩ | Resistor 22 | 10KΩ |

Figure 5:
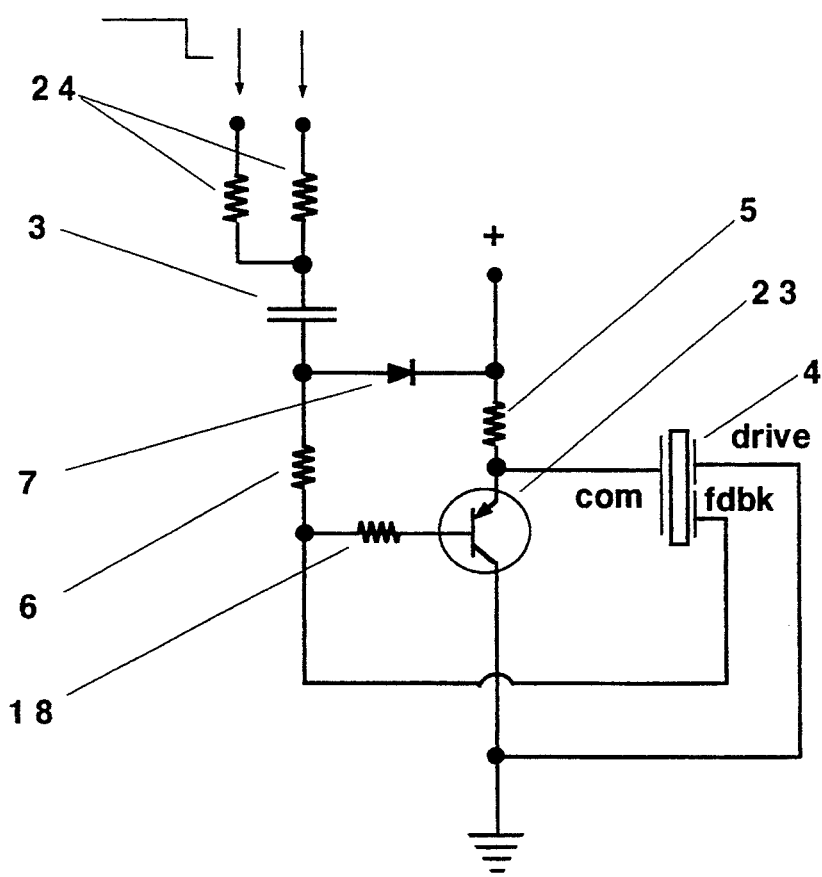
FIG. 5 is a schematic diagram of Species 3 demonstrating a negative input amplifier.

Referring to FIG. 5, preferred embodiment of Species 3 is depicted in which a negative input amplifier is demonstrated. It can be seen that the basic circuit is changed very little.

Positive input amplifier 2 from FIG. 1 is replaced with PNP transistor 23. Because transistor 23 inverts the output relative to an NPN transistor, the drive and common connections to disc 4 are reversed so that the output from transistor 23 remains in phase with the oscillations of disc 4. Discharge rectifier 7 is now connected to the permanent positive voltage source. In addition, a new method of connecting to multiple signal sources is shown. In this method, the diodes from FIGS. 2 & 3 are replaced with signal resistors 24. The advantage is that the signal plate of capacitor 3 can now be discharged directly by the signal, without an additional discharge resistor. A disadvantage is that, with one signal high and the other low, resistors 24 act as a voltage divider, effectively halving the signal voltage, which in turn reduces volume. In applications requiring different volumes in response to different signals, this effect can be used to advantage by using different value resistors here. Or diodes and resistors can be mixed.

Operation is triggered with a falling wave signal, but is otherwise similar to FIG. 4. Prior to a cycle, capacitor 3 is in a discharged state, both terminals being at a positive potential. When the voltage at either signal terminal drops, capacitor 3 begins charging through one of the signal resistors 24, drawing bias current out of transistor 23, providing the required DC input component for amplifier operation. Again, as capacitor 3 nears full charge, oscillations taper and cease. At the end of a signal cycle capacitor 3 remains charged to signal voltage. When the signal voltage rises, the potential on the amplifier side of capacitor 3 is brought above that of the positive voltage supply, forward biasing discharge rectifier 7.

Suggested components are:

| Capacitor 3 | .043 µF | Diode 7 | 1N4000 |
|---|---|---|---|
| PZ disc 4 | M.E. PKM11-6AO | Resistor 18 | 3.9KΩ |
| Resistor 5 | 510Ω | Transistor 23 | NTE290A |
| Resistor 6 | 150KΩ | Resistors 24 | 600Ω |

Figure 6:
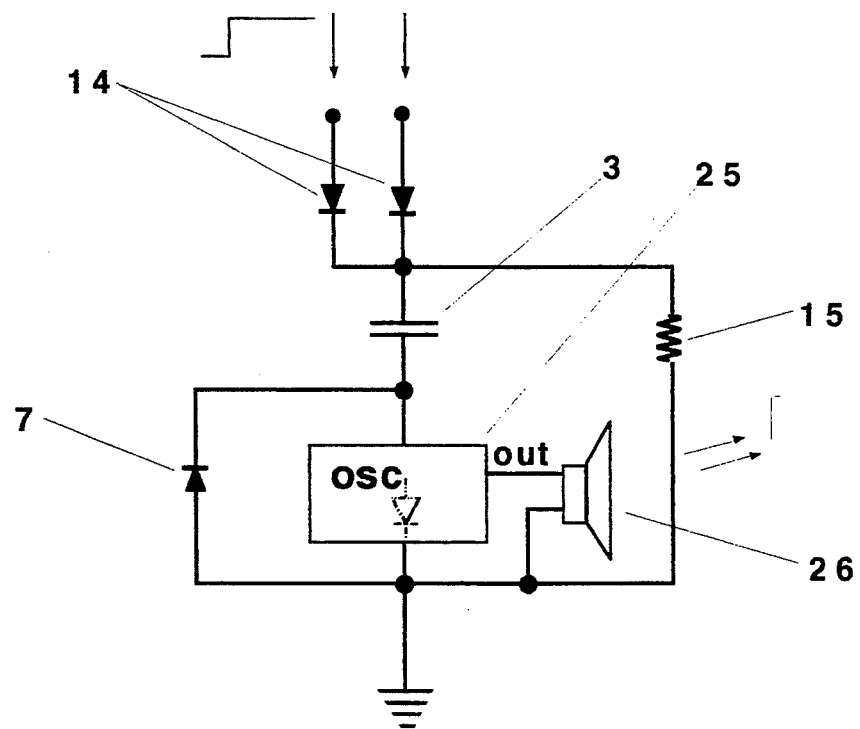
FIG. 6 is an alternative, generalized way of describing Species 1, used in claim 16.

Referring to FIG. 6, a generalized schematic of Species 1 is presented showing the separate functions of frequency generation and sound production. Here, it is clearly seen that Species 1 of the invention is simply a capacitor having separate charge and discharge paths with an oscillator and transducer in the charge path.

Capacitor 3 is charged through signal rectifiers 14 when the voltage of the input signal rises. Charging current flows through semiconductor oscillator 25 to ground. The output of oscillator 25 is connected with audio transducer 26 which emits sound. When the voltage of the input signal falls, capacitor 3 is allowed to discharge through discharge rectifier 7 and through discharge resistance 15, not through the oscillator.

Figure 7:
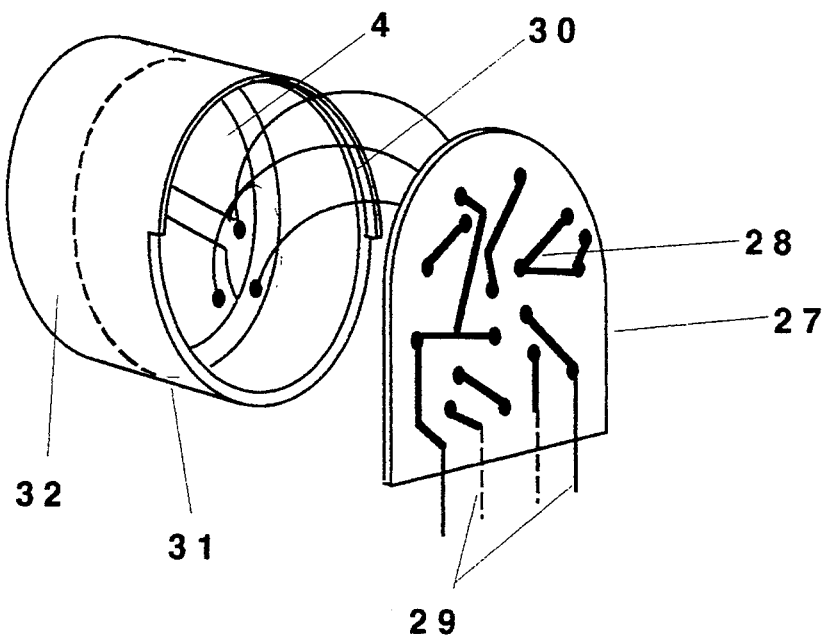
FIG. 7 is an open view of the invention, showing case assembly for circuit board installations.

Referring to FIG. 7, the case is shown just prior to final assembly. Terminal board 27 with printed circuit 28 and metal connecting pins 29 (two or more depending on the circuit) is glued onto annular ridge 30 of standard buzzer case 31. A portion of case 31 extending beyond ridge 30 around the bottom has been removed to allow overlapping installation of board 27. Piezoelectric disc 4 has already been electrically connected to printed circuit 28 and glued into place over resonating chamber 32. Note that once assembled, all components and circuitry on terminal board 26 are enclosed and protected by the standard plastic buzzer case.

Figure 8:
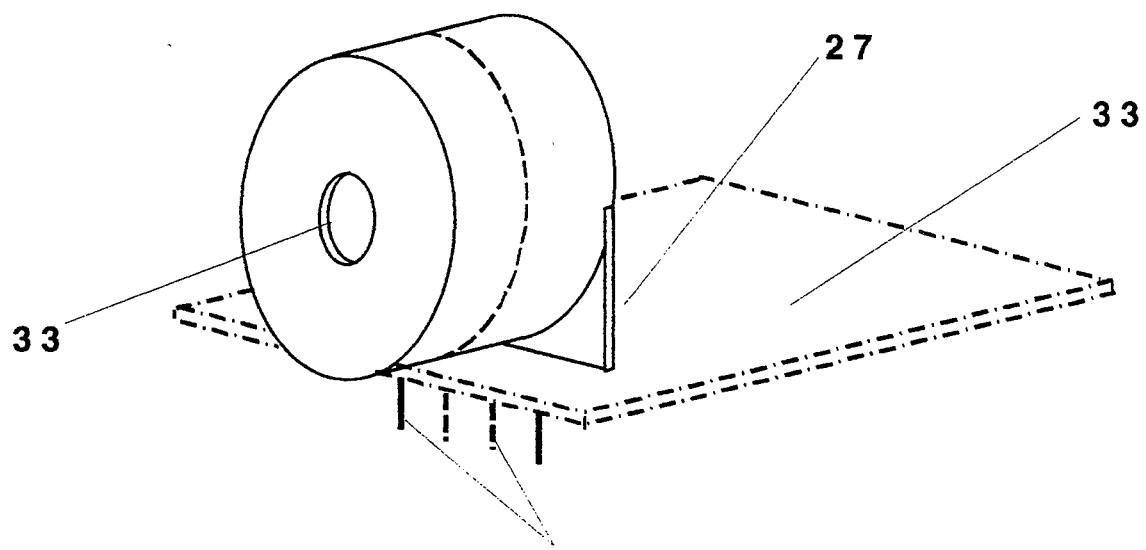
FIG. 8 is a view of the assembled invention with case design for circuit board installation.
Figure 9:
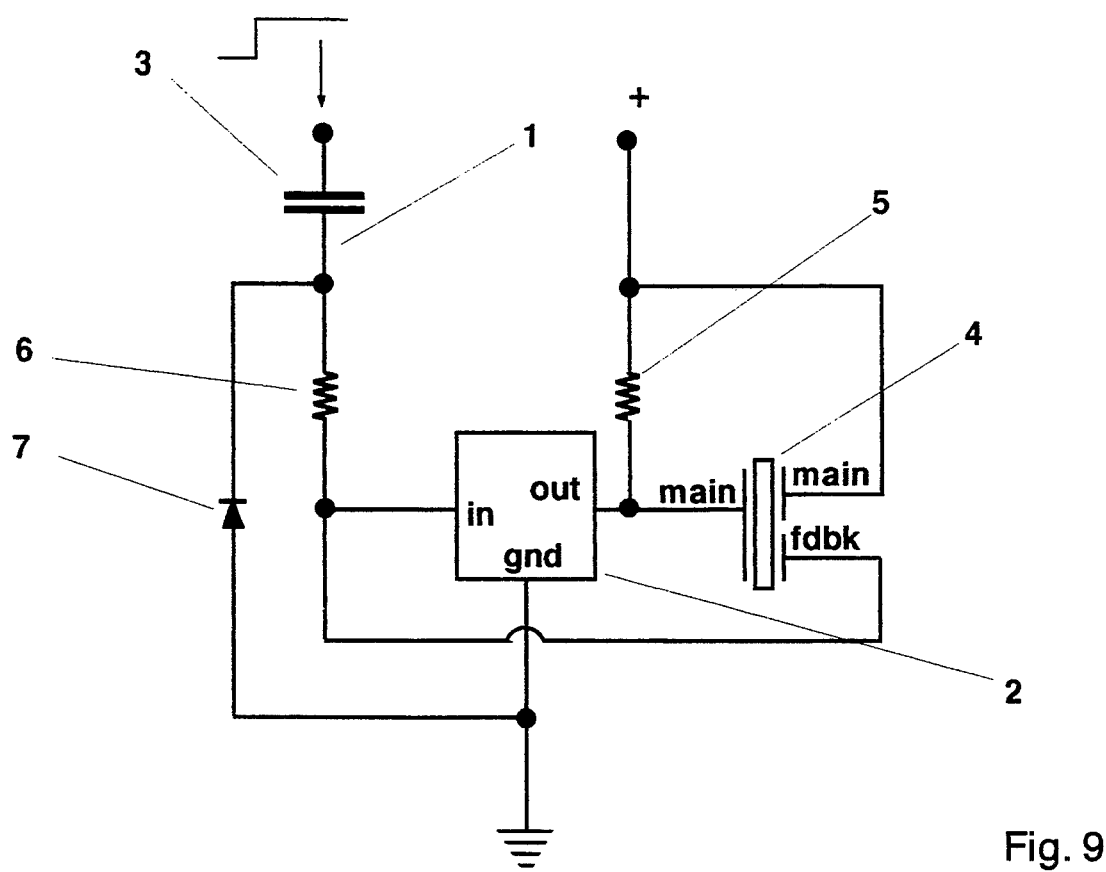
FIG. 9 is a generalized schematic showing the piezoelectric disc connected across the load resistor.
Figure 10:
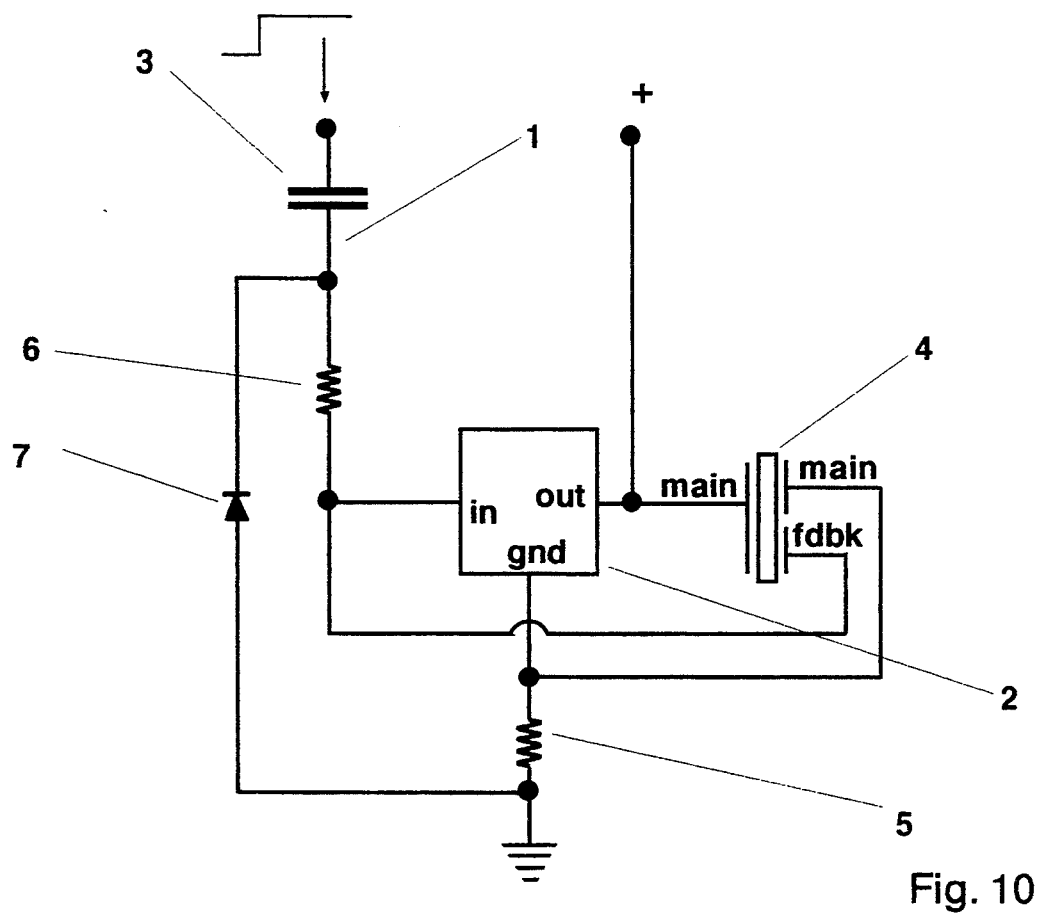
FIG. 10 is a generalized schematic showing the load resistor on the grounded side of the amplifier with piezoelectric disc across the amplifier.
Figure 11:
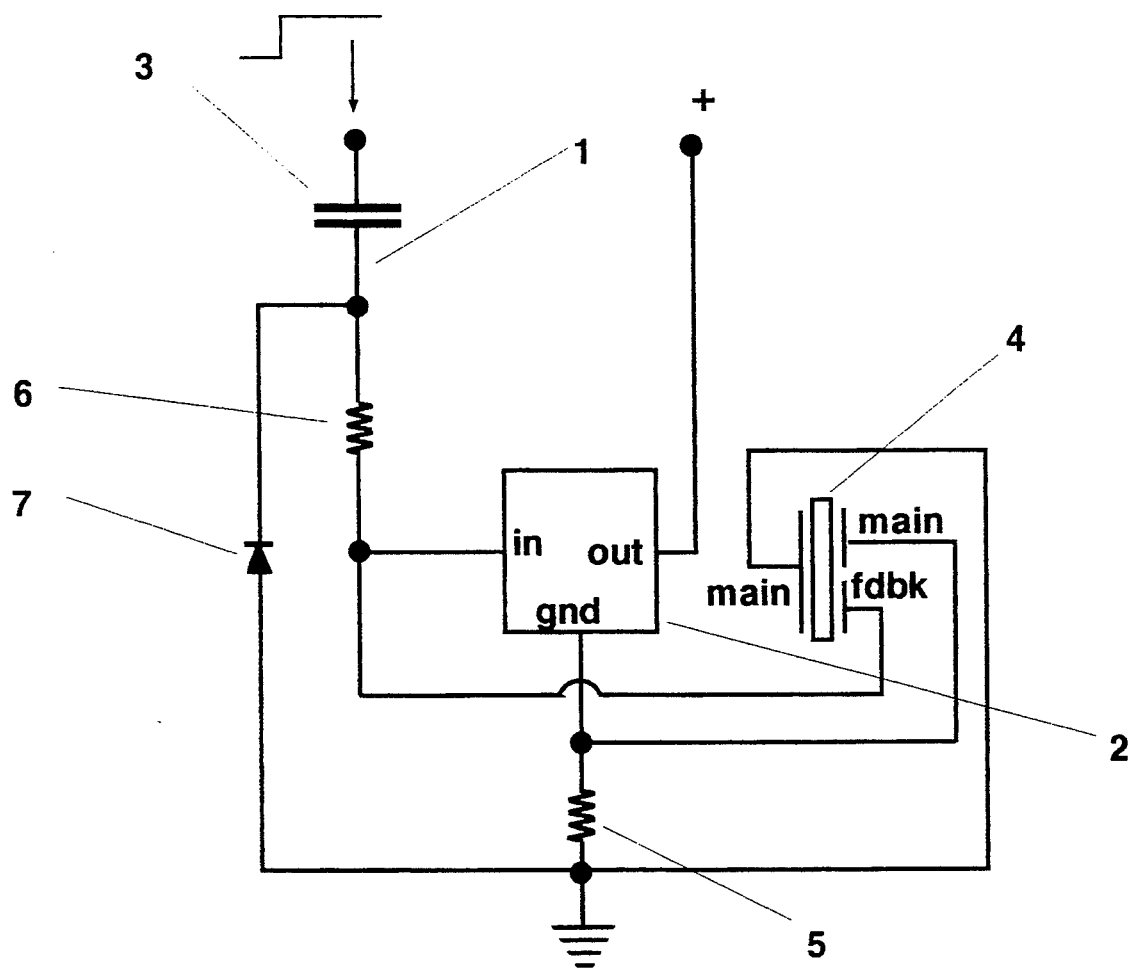
FIG. 11 is a generalized schematic showing the load resistor on the grounded side of the amplifier with the piezoelectric disc across the load resistor.

Referring to FIG. 8, the assembled invention is shown. To install it, metal pins 29 are inserted into holes on circuit board 33 and soldered. Note that sound release hole 33 is on end opposite that of terminal board 27 and connection pins 29.

What is claimed is:

1. In an electrical circuit presenting two voltage sources comprising a positive voltage source and a ground voltage source, and a first signal voltage source presenting alternately an active voltage level and an inactive voltage level, signal annunciator apparatus for providing an audio output signal in response to an active voltage level in the first signal voltage source comprising in combination:

a load conductor connected between the positive voltage source and the ground voltage source, an amplifier having an amplifier input connection and two amplifier load connections, the amplifier load connections comprising an output connection and a ground connection, the output connection and ground connection of the amplifier connected in series with the load conductor, the output connection being connected through the load conductor to the positive voltage source, and the ground connection being connected through the load conductor to the ground voltage source, a load resistance connected in series with the load conductor, an amplifier input conductor connected to the amplifier input connection and to the first signal voltage source, the voltage level in the first signal voltage source being transmitted through the amplifier input conductor to the amplifier input connection, the amplifier allowing current to flow between the output connection and the ground connection when an active voltage level is present at the amplifier input connection, a three electrode piezoelectric disc having two main electrodes and a feedback electrode, one main electrode of the piezoelectric disc connected to the load conductor between the load resistance and an amplifier load connection, the other main electrode of the piezoelectric disc connected to a voltage source, the feedback electrode of the piezoelectric disc connected to the amplifier input conductor, a capacitor in series with the amplifier input conductor between the signal voltage conductor and the feedback electrode, whereby, in response to an active voltage level in the first signal voltage source, the capacitor begins charging, providing initially, an active voltage level at the amplifier input connection and allowing the amplifier and disc to operate together as a feedback oscillator, emitting sound as the capacitor charges, with the sound level decaying to zero as the capacitor becomes fully charged.

2. Signal annunciator apparatus as in claim 1 wherein an amplifier input resistance is connected in series with the amplifier input conductor between the capacitor and the feedback electrode.

3. Signal annunciator apparatus as in claim 1 wherein a feedback input resistance is connected in series with the feedback electrode between the feedback electrode and the amplifier input connection.

4. Signal annunciator apparatus in claim 1 with an input resistance connected in series between the first signal voltage source and the capacitor, whereby, the input impedance of the signal annunciator is increased.

5. Signal annunciator apparatus as in claim 1 wherein the amplifier is an NPN transistor having an emitter, a collector and a base and the active voltage level in the first signal voltage source to which the annunciator responds is a high voltage level and the inactive voltage level is a low voltage level, connected as follows:
the emitter connected as the ground connection,
the collector connected as the output connection,
the base connected as the amplifier input connection,
whereby, the annunciator responds when a high voltage level is presented by the signal voltage source.

6. Signal annunciator apparatus as in claim 1 wherein the amplifier is an PN transistor having an emitter, a collector and a base and the active voltage level in the first signal voltage source to which the annunciator responds is a low voltage level and the inactive voltage level is a high voltage level, connected as follows:
the emitter connected as the output connection,
the collector connected as the ground connection,
the base connected as the amplifier input connection,
whereby, the annunciator responds when a low voltage level is presented by the signal voltage source.

7. Signal annunciator apparatus as in claim 5 with a discharge rectifier having an anode connection and a cathode connection connected as follows:
the cathode connection connected to the amplifier input conductor between the capacitor and the amplifier input connection,
the anode connection connected to the ground voltage source,
whereby, when the first signal voltage source presents an inactive voltage level, the capacitor is discharged.

8. Signal annunciator apparatus as in claim 6 with a discharge rectifier having an anode connection and a cathode connection connected as follows:
the cathode connection connected to the amplifier input conductor between the capacitor and the amplifier input connection,
the anode connection connected to the positive voltage source,
whereby, when the first signal voltage source presents an inactive voltage level, the capacitor is discharged.

9. An electronic noisemaking device with terminal pins for electrical connection to a circuit board having preformed holes, by means of inserting the terminal pins into the preformed holes in the circuit board and soldering, and comprising a flat transducing element, a resonating chamber with a sound release hole and a terminal board having an edge with circuit means for energizing said transducing element electrically connected with the transducing element, the transducing element being between the terminal board and the resonating chamber and said resonating chamber, said transducing element and said terminal board being axially located to one another in three parallel planes within a case having an outer edge made of a light solid material such as plastic, wherein the improvement comprises:
said edge of the terminal board protruding beyond the outer edge of said case,
the terminal pins connected to the terminal board in the same plane as the terminal board and extending beyond said edge of the terminal board,
whereby, once the noisemaking device is connected to the circuit board by soldering the pins in the preformed holes, the plane of the transducing element is perpendicular to the plane of the circuit board.

* * * * *